UNITED STATES PATENT OFFICE.

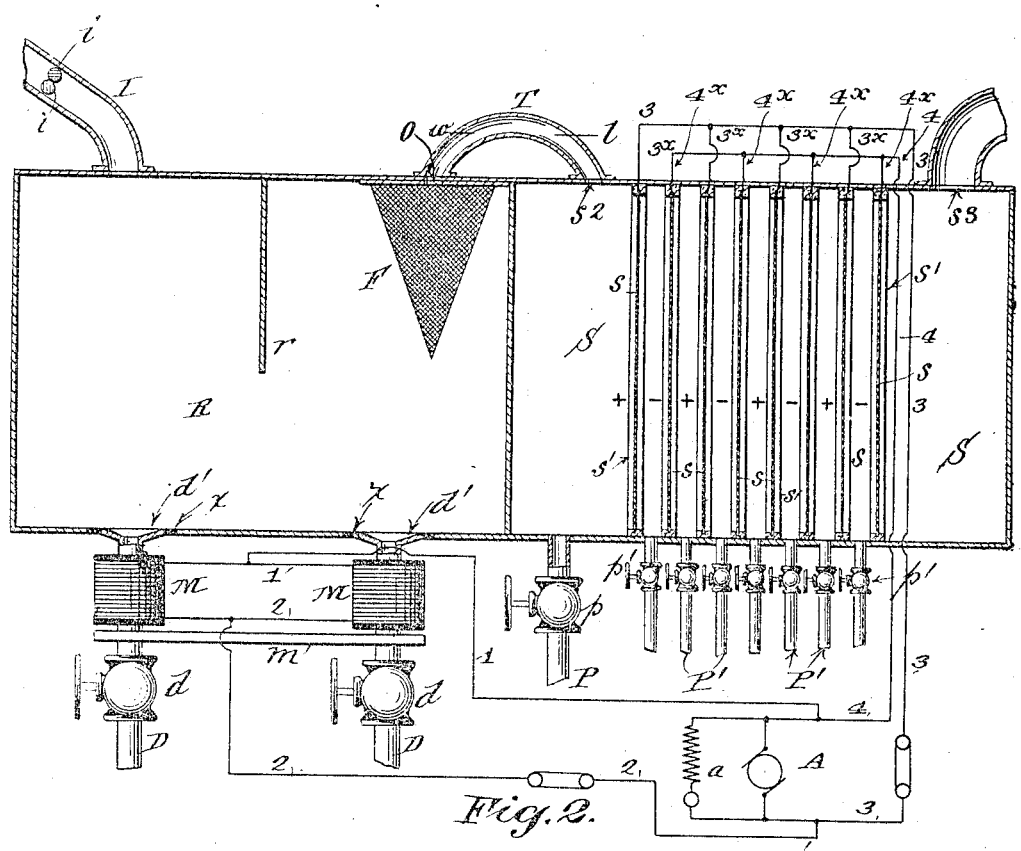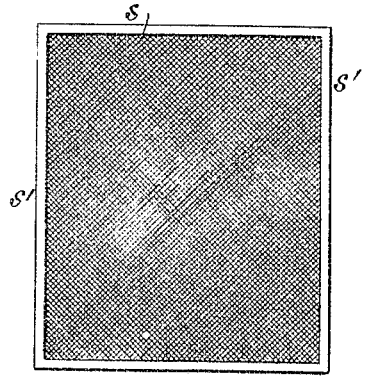

ALBERT E. WILLIAMS, OF JERSEY CITY, NEW JERSEY.

PURIFICATION OF LIQUIDS.

960,608.

Specification of Letters Patent.    Patented June 7, 1910.

Application filed March 22, 1909. Serial No. 485,085.

*To all whom it may concern:*

Be it known that I, ALBERT E. WILLIAMS, a citizen of the United States, residing in Jersey City, Hudson county, and State of New Jersey, have invented certain new and useful Improvements in the Purification of Liquids, of which the following is a specification.

My improvements relate to the purification of fluids, as oils, water, and other liquids holding solid or semi-solid matter in suspension or solution, particularly sewage, and the invention consists in the combination and arrangement of parts hereinafter described and claimed specifically, whereby matter held in suspension and containing paramagnetic substances is deflected by intense electro-magnetic influence, while the solid or semi-solid diamagnetic matter is arrested mechanically, and matter held in solution in the residual fluid is rendered insoluble and precipitated in the manner set forth,—thus separating and segregating the several grades of material eliminated from the fluid.

In the accompanying drawings, Figure 1, represents more or less diagrammatically, a sectional elevation of apparatus suitable for the practical application of my invention; Fig. 2, is a diagrammatic representation of one of the electric screens used.

Although the essential features of my invention are applicable for the purification of various liquids, oils &c., by way of illustration, I herein show and describe my improvements as adapted to the treatment and purification of sewage.

R, represents a receiving chamber into which the sewage passes from the inlet pipe I, the latter being provided with rollers *i, i,* which reduce the thicker constituents of the sewage to a pulp, thereby rendering the mass more amenable to subsequent treatment. The upper portion of the receiving chamber R, is divided centrally, or approximately so, by a partition *r,* extending downward a sufficient distance to insure the passage of the sewage within the magnetic influence of the drain pipes D, D, as the sewage flows toward the inverted conical filter F. The drain pipes D, D, are practically the hollow poles of the electromagnets M, the pipes being made of wrought iron wound with copper wire of sufficient size and number of ampere turns. The pipes D, D, are connected mechanically but not magnetically, by the cross bar *m* which simply represents a means of support. Below the magnets M, the discharge pipes D, D, are provided with discharge gates or valves *d, d;* and their receiving ends *d', d',* are flared, preferably, and insulated (as indicated by *x, x,*) from the body of the receiving tank R.

A, represents symbolically a dynamo or other source of direct electrical current, and *a,* the regulator and field. The windings of the electro-magnets M, M, are included in the electric circuit 1 and 2, which, when closed causes the magnets to exert a powerful and intense attractive force upon paramagnetic substances contained in the matter held in suspension in the sewage. It is well known that effete animal matter contains more or less iron and other metallic substances, as well as metallic salts and oxids which are paramagnetic, and matter holding such paramagnetic substances, even in relatively small proportions, I deflect and draw to the bottom of the receiving chamber R, by means of the magnets M, M, when in circuit. The diamagnetic solid or semi-solid matter I separate from the sewage by mechanical means, that is to say by straining.

The filter or strainer F, is preferably of inverted conical shape supported upon the top of the receiving tank R, and covering the outlet O, which communicates through the transfer pipe T, with the supplementary tank or chamber S. This conical strainer F, is preferably made of fine copper wire woven in cloth, so as to exclude and hold back practically all solid matter, only the residual matter held in solution passing over to the supplementary chamber S. The supplementary chamber S is provided with a series of transverse screens *s, s,*—these screens being also preferably made of fine copper wire woven in cloth. They are insulated from the walls of the chamber S, by being inserted in porcelain frames *s', s',* or otherwise, and are firmly secured in position parallel to each other and interposed between the inlet $s^2$, and the discharge $s^3$. A drain pipe P, provided with a valve $p$, communicates with the space in the supplementary chamber S, in front of the series of screens $s, s$, and the spaces between the said screens are also furnished with individual drain pipes P', provided with valves $p'$. In the drawings the first, third, fifth and seventh screens are connected with positive terminals $3^x$ from the loop 3, and the second, fourth, sixth and eighth screens are connected with the negative terminals $4^x$ from the loop 4, of the electric circuit 3—4— of which the dynamo A, or other source of direct electrical current forms a part.

In practice, the sewage in the receiving chamber R, in flowing to the screen or filter F, is forced by the partition $r$, to pass within the intense magnetic influence of the magnets M, M, acting through the medium of the drain pipes D, D, so that substances held in suspension and containing paramagnetic matter, are drawn to the bottom of the reservoir R, while the insoluble diamagnetic matter which passes over is arrested and held back by the screen F, which as before stated only allows matter held in solution to pass through the transfer pipe T into the supplementary chamber S, where soluble matter is rendered insoluble and precipitated by the action of the screens $s, s$,—the electrically positive screens causing the generation of hydrogen and the electrically negative screens causing the generation of oxygen, so that by the time the liquid has passed through the series of screens, matter previously held in solution is reduced, precipitated and eliminated from the final discharge of water passing through the exit $s^3$. The precipitates are removed from time to time through the valves $p, p'$.

In the operation of discharging the contents of the receiving chamber R, through the valves $d, d$, the inverted conical filter F, is cleansed automatically by reason of the back pressure and flow incidental to the height of the water level $w'$, indicated in Fig. 1,—this cleansing operation being facilitated and rendered most effective by reason of the inverted conical shape of the filter.

It will be seen that I not only purify the liquid by eliminating both solids and soluble matter, but I also in the process separate and segregate the grades of material eliminated.

When operating upon a small scale a single electromagnet M, may be sufficient but I prefer ordinarily to use a plural number.

What I claim as my invention and desire to secure by Letters Patent is,

1. In apparatus of the character described, the combination of a receiving chamber, an electromagnet at the bottom of said receiving chamber, means for exciting said magnet electrically, means for discharging from the bottom of said receiving chamber, a strainer in the upper part of said receiving chamber, means for conducting the liquid passing through said strainer to a supplementary chamber, said supplementary chamber, a series of screens in said supplementary chamber the alternate members of which are respectively connected with electropositive and electronegative terminals of an electric circuit, and means for discharging the liquid and the precipitates separately from said supplementary chamber, substantially in the manner and for the purpose described.

2. In apparatus of the character described, the combination of a receiving chamber, a plurality of electromagnets at the bottom of the receiving chamber, means for exciting said magnets electrically, means for discharging from the bottom of said receiving chamber, a strainer in the upper part of said receiving chamber, means for conducting the liquid passing through said strainer to a supplementary chamber, said supplementary chamber, a series of screens in said supplementary chamber the alternate members of which are respectively connected with electropositive and electronegative terminals of an electric circuit, and means for discharging the liquid and the precipitates separately from said supplementary chamber, substantially in the manner and for the purpose described.

3. In apparatus of the character described, the combination of a receiving chamber, an electromagnet at the bottom of said chamber formed with a hollow pole constituting a discharge pipe, a valve in said discharge pipe, means for exciting said magnet electrically, a strainer in the upper part of said receiving chamber, means for conducting the liquid passing through said strainer to a supplementary chamber, said supplementary chamber, a series of screens in said supplementary chamber, the alternate members of which are respectively connected with electropositive and electronegative terminals of an electric circuit, and means for discharging the liquid and the precipitates separately from said supplementary chamber, substantially in the manner and for the purpose described.

4. In apparatus of the character described, the combination of a receiving chamber, a plurality of electromagnets at the bottom of said chamber formed with hollow poles constituting discharge pipes, valves in said discharge pipes, means for exciting said magnets electrically, a strainer in the upper part of said receiving chamber, means for conducting the liquid passing through said strainer to a supplementary chamber, said supplementary chamber, a series of screens in said supplementary chamber, the alternate members of which are respectively connected
5 with electropositive and electronegative terminals of an electric circuit, and means for discharging the liquid and the precipitates separately from said supplementary chamber, substantially in the manner and for the purpose described.

ALBERT E. WILLIAMS.

Witnesses:
D. W. GARDNER,
GEO. WM. MIATT.